United States Patent [19]

Quarmby

[11] 3,813,646

[45] May 28, 1974

[54] PATTERN RECOGNITION DEVICES

[75] Inventor: David John Quarmby, London, England

[73] Assignee: Emi Limited, Hayes, Middlesex, England

[22] Filed: Oct. 17, 1972

[21] Appl. No.: 298,380

Related U.S. Application Data

[63] Continuation of Ser. No. 91,777, Nov. 23, 1970, abandoned.

[52] U.S. Cl. .......................................... 340/146.3 AE

[51] Int. Cl. .............................................. G06k 9/02

[58] Field of Search ........... 340/146.3 AE, 146.3 D

[56] References Cited

UNITED STATES PATENTS

| | | | |
|---|---|---|---|
| 2,968,789 | 1/1961 | Weiss et al. | 340/146.3 AE |
| 3,268,864 | 8/1966 | Kubo et al. | 340/146.3 AE |

*Primary Examiner*—Paul J. Henon
*Assistant Examiner*—Joseph M. Thesz, Jr.
*Attorney, Agent, or Firm*—Fleit, Gipple & Jacobson

[57] ABSTRACT

An input arrangement for the decision mechanism of a pattern recognition device includes a cathode ray tube arranged to execute a raster of successive scanning sweeps over an area which may include a pattern having an edge. Apparatus is provided for detecting an edge during one scanning sweep and for producing signals indicative of the position co-ordinates of the detected edge. A region of the area adjacent to the detected edge is searched during at least one subsequent sweep to detect an extension of the edge and apparatus is provided for producing further signals indicative of the position coordinates of any such extension. Analyzing means are provided to analyze said signals and to produce input signals respectively representing the position, length, orientation and curvature of a subsequentially circular arc indicative of said edge. Means are provided for applying said input signals to said decision mechanism.

4 Claims, 3 Drawing Figures

David J. Quarmby
Inventor
By Fleit, Gipple & Jacobson
Attorneys

PATTERN RECOGNITION DEVICES

This is a continuation of application, Ser. No. 91,777, filed Nov. 23, 1970 and now abandoned.

The present invention relates to pattern recognition devices.

In a typical pattern recognition device an input pattern is sensed or scanned by a transducer, such as a television pickup tube, to derive representative electrical signals, which are then passed to a decision mechanism. Commonly there is provided prior to the decision mechanism an arrangement which extracts those features from the electrical signals which are pertinent to the task in hand, rejecting data which plays no part in it. The main task of such an arrangement, commonly called a preprocesser, is to reduce the complexity of the problem for the decision mechanism.

It is an object of the present invention to provide an improved input arrangement for the decision mechanism of a pattern recognition device.

It is a further object of the invention to provide means for analysing position signals indicative of points on an edge in a pattern to provide signals representing a series of substantially circular arcs indicative of respective portions of said edge, each arc being defined by signals indicative of the arc's position, length, orientation and curvature.

Figure 1:
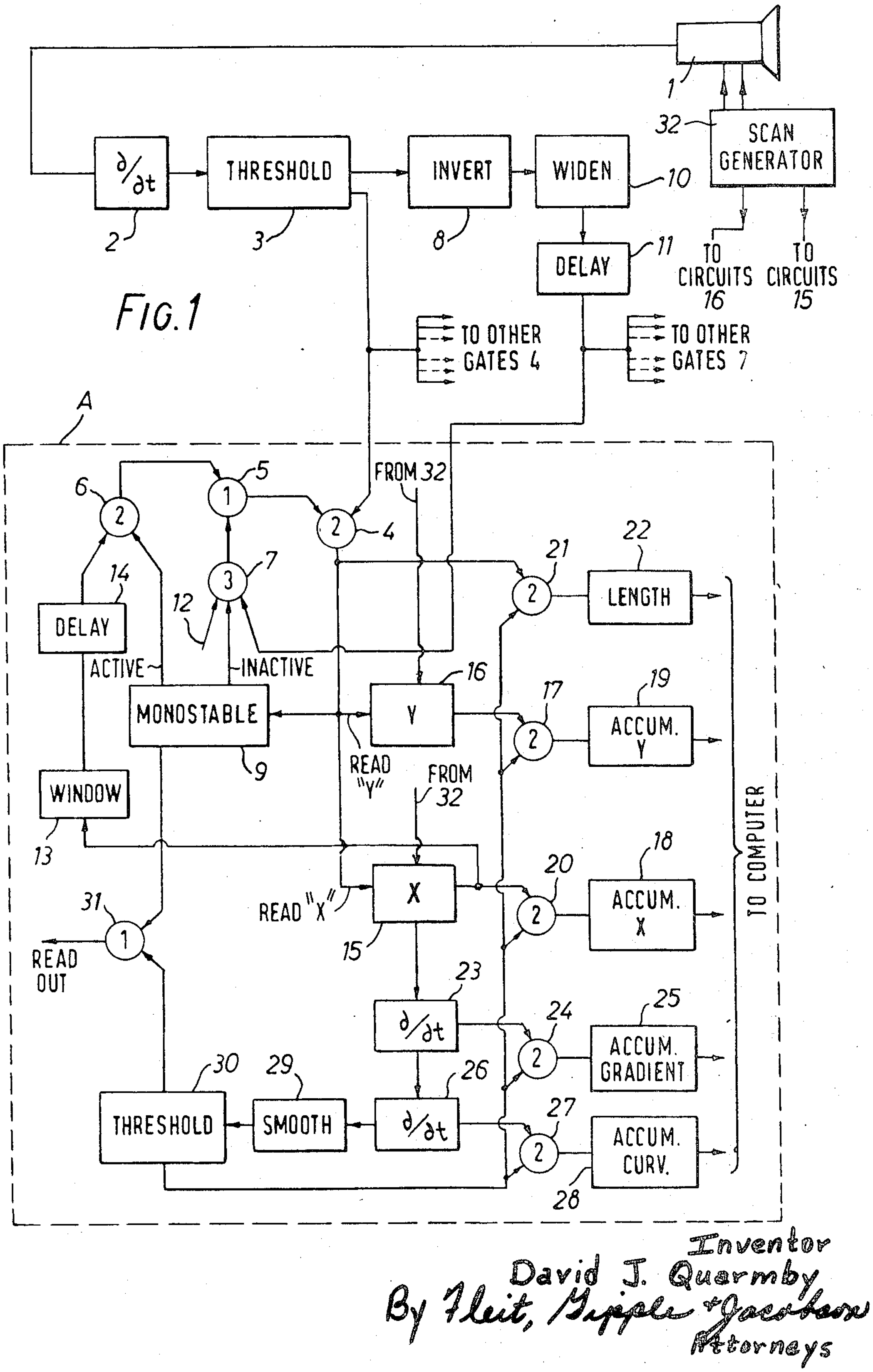
Figure 2A:
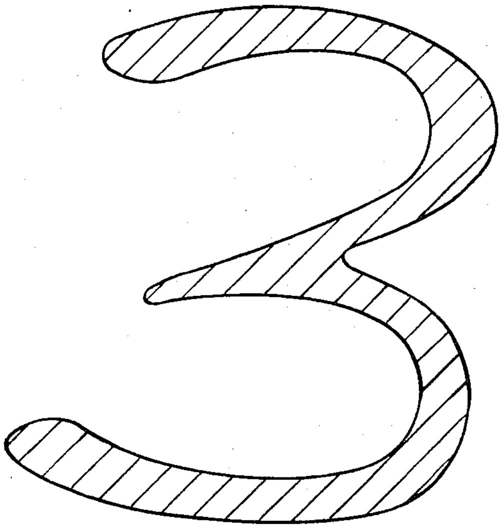
Figure 2B:

In order that the present invention may be fully understood and readily carried into effect, it will now be described with reference to the accompanying drawings, of which:

FIG. 1 is a block diagram of one example of an input arrangement according to the present invention, and FIGS. 2a and 2b are diagrams illustrating the effect of the arrangement shown in FIG. 1.

The arrangement to be described is responsive to the normal line scan such as is produced by a television pick-up tube or flying spot scanner, either of which may be used as a transducer. As the transducer scans a field containing patterns to be recognised, on any one line the arrangement searches for a sharp step in density by differentiating the video waveform and applying it to a threshold circuit. Whenever an edge is found the X (horizontal) and Y (vertical) co-ordinates of the edge point are read from the scan controller. The X co-ordinate is used to open a window on the following line. If a second edge point is found within the window on this line, it is associated with the first, a mean X and mean Y position are calculated, and a measure of gradient determined. As the scan proceeds, mean gradients are stored and curvature measurements produced by means of gradient differentials. An edge representation is then obtained in the form of a series of edge segments, each segment being an arc of a circle, each arc being described by the following five parameters: mean X position; mean Y position; mean gradient; mean curvature; and length.

Referring now to FIG. 1, the video waveform from the scanning of a field containing patterns to be recognised by a pick-up tube 1, having electrostatic deflection plates fed from scan generator 32 supplying the line and frame scanning waveforms, is applied to a differentiator 2 whose output is applied to a threshold circuit 3. Thus if during a particular scan line an edge in a pattern is met this results in the production of a sharp pulse from differentiator 2, producing an output pulse from threshold circuit 3 if it exceeds a predetermined threshold. Threshold circuit 3 has two outputs, one of which is applied in parallel to each one of a plurality of circuit arrangements of the type shown in outline A, that is firstly as one of the inputs to each one of a plurality of two-input AND gates 4. The other input to each gate 4 is applied from an OR gate 5, which is provided with two possible inputs, one from a three-input AND gate 7, and the other from a two-input AND gate 6. Each circuit arrangement such as that shown in outline A includes a respective monostable circuit 9, which when active provides an input to the respective gate 6, and when inactive an input to the respective gate 7. The other output of threshold circuit 3 is applied to an inverter 8, thence to a widening or pulse stretching circuit 10, and thence to a delay circuit 11 which gives a delay of one line scan. The output from delay circuit 11 is applied in parallel as one of the inputs to each of the gates 7, and it is arranged that the first circuit arrangement such as A with an inactive monostable 9 produces a signal on line 12 as the third input to the respective gate 7. Assuming that a scan of a pattern commences with all monostables 9 inactive, than as soon as an edge is detected, one line scan later the gate 7 in the first circuit arrangement A is opened, in turn opening its gate 4 by means of a signal via its gate 5. Thus if a pulse due to an edge occurs on the next line scan it passes through the gate 4 of the first circuit arrangement A to set its monostable 9 into an active state, so that the respective gate 7 is closed, but a signal is applied to the respective gate 6. The X and Y co-ordinates of the edge point are read from the circuits 15 and 16 of the first circuit arrangement A. Circuits 15 and 16 may be constituted by counters fed from the X and Y scan generator and read by the signal from gate 4. Thus circuit 15 may count clock pulses at the degree of resolution required and be cleared by line flyback pulses; and circuit 16 may count line flyback pulses and be cleared by frame pulses. The X co-ordinate signal is used to open a window on the following line by means of pulses stretching circuit 13 and a delay circuit 14, which gives a delay of one scan line, providing an input to gate 6, the time constant of monostable 9 being about 1½ lines, so that gate 6 is opened, and hence gate 4, to allow through a pulse due to any part of the edge which is within the window. If more of the edge is detected within the window, it is associated with the first, and its X and Y co-ordinates read and stored with those due to the first edge point in accumulators 18 and 19 respectively, the signals being passed through two-input AND gates 20 and 17 respectively. The first edge point detected also causes a pulse to be applied through a two-input AND gate 21 to a counter 22. Thus as long as edge points are detected, the process of accumulation of X and Y co-ordinates continues. When an edge terminates, monostable 9 fails to be reset. As the scan continues signals due to the X co-ordinates are passed to a differentiator 23 to determine their rate of change, and each successive value is passed through a two-input AND gate 24 to be stored in an accumulator 25, and the rate of change signals are themselves differentiated by a differentiator 26 and successive signals therefrom passed through another two-input AND gate 27 to be stored in an accumulator 28. Thus the counter 22 sets up a measure of the length of an edge; accumulators 18 and 19 provide a measure of the mean X and Y co-ordinates of an edge; accumulator 25 stores a measure of the mean gradient of the edge in the X–Y plane to provide a parameter of the orientation of the edge; and accumulator 28 stores a measure of the mean curvature of an edge. The other signal to keep open gates 21, 17, 20, 24 and 27 is provided as follows. Another output from differentiator 26 is passed to a smoothing circuit 29 and a threshold circuit 30. If threshold circuit 30 detects that the curvature is less than a predetermined value it provides an output to maintain the aforesaid gates open, but if the curvature increases above the threshold this signal is shut off and the gates closed, an output being provided through an OR gate 31 to read out the contents of counter 22, and accumulators 19, 18, 25 and 28. Furthermore if it occurs that monostable 9 is not reset due to the cessation of an edge, it provides another input to gate 31 to read out the contents of counter 22 and the accumulators. Thus if either an edge ceases or a point of substantial curvature is detected, the contents of the counter 22 and the accumulators 18, 19, 25 and 28 are read out and reset to zero. In the latter case as soon as this happens, the next arrangement such as A which includes an inactive monostable 9 is brought into operation to scan the rest of the edge by applying a signal to input 12 of the gate 7 of the respective arrangement. Furthermore the same occurs if another edge is located during the scanning of a given edge. Four scans of a pattern are performed. The first is a horizontal scan detecting edges going from white to black, provided that their gradients lie within $\pm 45°$ to the vertical direction. This angle limit is set by the window width. The second scan is a repeat for black to white edges — achieved by means of switching an inverter between differentiator 2 and threshold circuit 3 in this mode. These two scans are then repeated in the vertical direction by alternating the deflection plates to which the line and frame scanning waveforms are applied, in which case the roles of circuits 15 and 16 and accumulators 19 and 18 are reversed. Thus a black circle for example would be represented by four arcs, one detected on each scan.

Whenever the contents of counter 22 and the accumulators are read out they are passed to the decision mechanism such as a small digital computer, the programming of which is significantly less complex than would otherwise be the case due to the simplicity of the data fed to it. FIGS. 2(a) and 2(b) show how a pattern representing a FIG. "3" is transformed into a series of arcuate edge segments.

Prior to the feeding of data consisting of arc parameters from such an input arrangement according to the invention to a computer arranged as the decision mechanism, two normalisations of the data are preferably carried out. The first is for position variations, that is the centroid of the arcs is moved to the centre of the field of view involving changes in position measurements only. Secondly the size is normalised. This is done by setting the difference in maximum excursion of the detected arcs in the Y directions to a standard value, altering positions, curvatures and lengths, but maintaining aspect ratio unchanged. The decision mechanism therefore operates on relative rather than absolute position, curvature, and length measurements.

The first part of a method of operating a general purpose digital computer as the decision mechanism for an input arrangement according to the invention is to classify a given arc in to the most appropriate stored spread for each of a plurality of known patterns. Each spread for each pattern is assumed to be of a Gaussian form in five dimensions. The stored spreads (each representing an arc and its range of variation in five dimensional space) are in the form of a set of spreads for each pattern, and are built in to the computer prior to its decision mode. The memory requirement of only five descriptors per spread keeps the storage used within reasonable bounds. Each arc of an unknown pattern is substituted into every stored spread. This is a substitution in to the five dimensional Gaussian, and the probability density at the point defined by the arc is determined. For each known pattern the highest overall probability value is ascertained; that is a set of arcs from an unknown pattern is arranged to give sets of probabilities for each possible known pattern, the probabilities in each set being multiplied together, the largest product being taken to give an overall probability that the unknown pattern conforms to a given known pattern. The maximum of the last mentioned probabilities thus determines the unknown pattern.

The spreads are built into the computer as follows. The first arc seen is stored as the mean vector. A later arc is associated with a spread if it falls within a preset region around the mean. The spread must be reasonably distinct, so that there is some latitude for this setting. The association involves cumulative build-up of the mean and the variance, the latter being calculated from the mean range of two measurements. Temporary storage of the last are encountered in each distribution is needed for this. New stores are set up when arcs fall outside the arbitrary regions. A lumping of a pair of spreads takes place if two distributions come within a certain distance of each other.

What I claim is:

1. An input arrangement for a pattern recognition device comprising:

a. analysing apparatus for deriving position signals indicative of the position co-ordinates of points on an edge in a pattern, said apparatus comprising:

b. means responsive to said position signals for producing signals indicative of the length of said edge c. means responsive to said position signals for producing signals indicative of the gradient of said edge d. means responsive to said position signals for producing a curvature signal which varies to represent the curvature of said edge, e. threshold means for providing threshold initiation signals when the value of said curvature signal varies by more than a given threshold variation level, and f. edge classifying means responsive to each of said threshold initiation signals for applying said signals indicative of the position, length, gradient and curvature of a respective portion of said edge to a decision mechanism.

2. An arrangement according to claim 1 including a plurality of different stages rendered successively operative in response to position signals indicative of successive edges for providing further ones of said sets of signals.

3. An input arrangement according to claim 1, including edge following apparatus for deriving said position signals from a pattern including an edge presented thereto.

4. An input arrangement for a pattern recognition device according to claim 1, including edge following apparatus for producing said position signals comprising cathode ray tube means for executing a raster of scanning sweeps over a planar area in which there may be a pattern including an edge, means for detecting an edge in the pattern during one of said sweeps, means for producing first position signals indicative of the position coordinates in said area of said detected edge, means for searching on a subsequent sweep a region of said area adjacent said detected edge for an extension thereof, and means for producing further position signals indicative of the position coordinates of any such extension.

* * * * *